Feb. 19, 1935.  G. O. MATTER  1,991,364
SPOON HOLDER
Filed Dec. 26, 1933
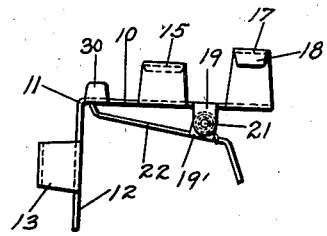
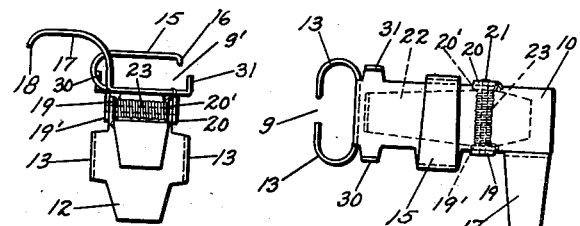
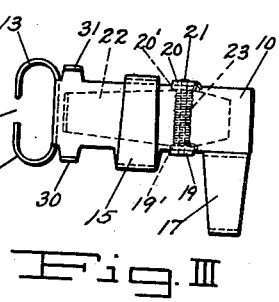
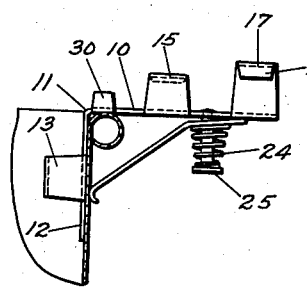
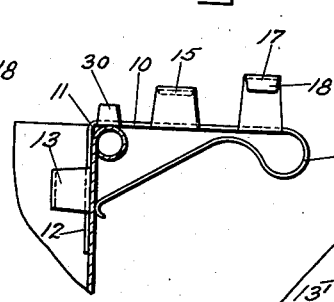
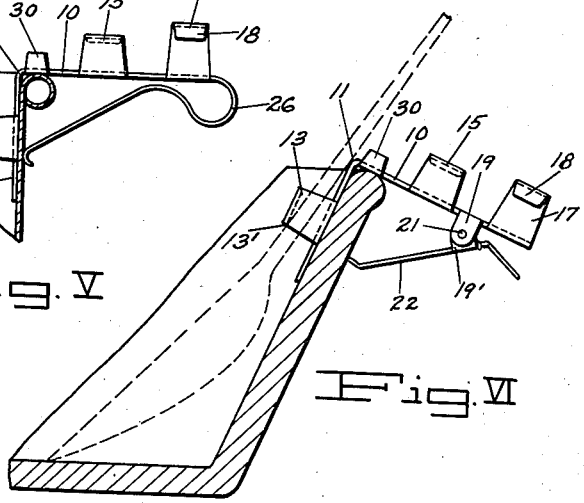
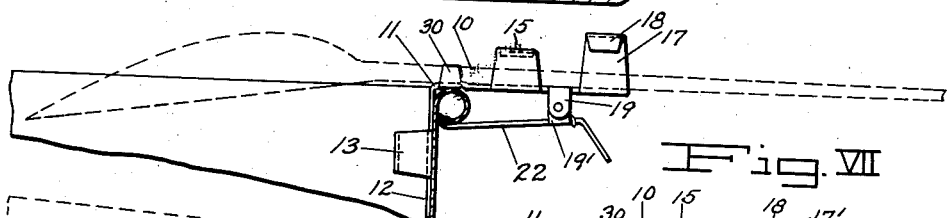
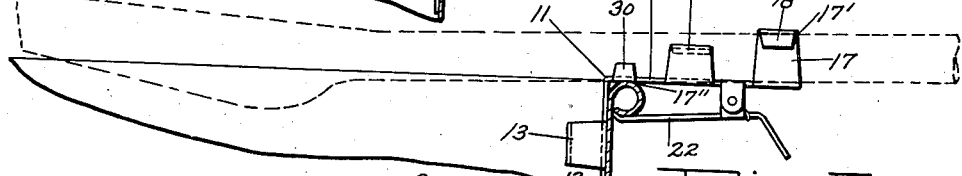
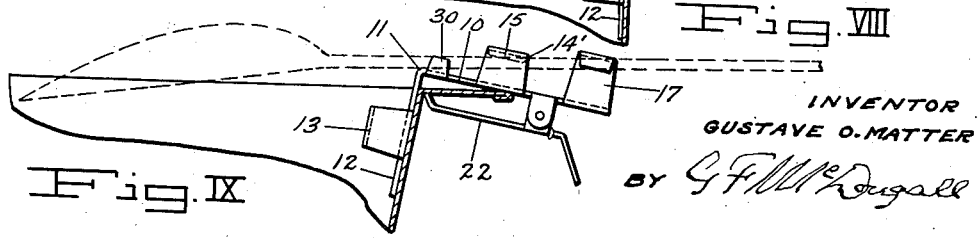
INVENTOR
GUSTAVE O. MATTER
BY G.F.McDougall
ATTORNEY Patented Feb. 19, 1935

1,991,364

UNITED STATES PATENT OFFICE 1,991,364

SPOON HOLDER

Gustave O. Matter, Portland, Oreg.

Application December 26, 1933, Serial No. 703,999

6 Claims. (Cl. 65—65)

My invention is a kitchen utensil having to do particularly with the practice of the culinary art and its purpose is to securely hold a spoon on a cooking utensil, such as one used to prepare jellies, jams, etc. where the use of a spoon is frequent but intermittent and one object of the invention is to provide a holder that may be easily attached to cooking utensils having a wide range of rim thickness and character of bead at the rim.

Another object of the invention is to provide a holder to which a spoon may be engaged by a single movement that will not only hold the spoon so that it can never slide into the cooking material but will also hold it securely suspended above the cooking material in such a way that the drip, if any, naturally falls back into the utensil.

A further object of my invention is to provide a device of the character described that is independent of grips or other arrangements that hold a spoon by friction, such as forcing it between coils of a helical spring as has been heretofore proposed.

A considerable variation in form is possible with my new invention and in the accompanying drawing several of those forms are illustrated.

In the drawing,—

Fig. I represents a side elevation of the preferred form of my spoon holder;

Fig. II is a right end view of Fig. I;

Fig. III is a plan view of Fig. I;

Fig. IV is a side elevation of a holder, in principle the same as that shown in Fig. I, but having a slightly different arrangement of attaching means for attaching it to a utensil, part of the rim of which is shown in section in this view;

Fig. V is a side elevation of the holder shown in Fig. I, also showing it attached to the rim of a utensil and having a modification of the gripping device that is different from either that shown in Fig. I or Fig. IV but which is in substance the same thing;

Fig. VI is a side elevation of the holder shown in Fig. I showing it attached to the edge of a flaring porcelain dish and holding a spoon, the bowl of which is submerged in the contents of the dish as represented by the dotted outline of the spoon in this figure.

Fig. VII is a view similar to Fig. VI showing the same holder attached to a utensil having a different kind of rim and holding a spoon, shown in dotted outline, above the contents of the utensil, the handle of the spoon resting flat on the top surface of the holder and balanced thereon.

Fig. VIII shows the same holder delineated in Figs. I, VI and VII attached to the same kind of a utensil shown in Fig. VII but holding a wooden spoon, with a large shank, above the contents of the utensil.

Fig. IX shows the same device delineated in Fig. VIII attached to a utensil having a flaring edge and illustrating partly the versatility of the preferred device as illustrated in the first three figures, and showing a spoon, in dotted outline, supported by the holder in a different manner than shown in the preceding views.

A detailed description now follows: The device consists of a base 10, bent at approximately right angles at 11, having a downwardly dependent integral leg 12, integral with which are two lugs 13, the two ends of which approach, leaving a gap $g$. This forms the device for holding the shank of a spoon in the manner shown in Fig. VI, the end of the spoon resting on the bottom of the dish and the handle held against the lug 13 as at 13' and resting on the angle 11 of the holder.

The narrow portion of the spoon handle will be passed through the gap $g$ and then to either side under the ends of the lugs 13 as shown in Fig. VI.

The base 10, has a lug 15, formed integral therewith and bent in such a manner that a gap $g'$ is left at one side, this gap being protected by the downwardly bent finger 16. The purpose of this lug is to hold a spoon shank when it is desired to suspend the bowl of the spoon above the contents of a utensil in the manner shown in Fig. IX, the spoon handle being supported by the lug 15 as at 14' and resting on the angle 11 of the body 10.

The base 10, also has another integral clip formed therewith and bent in the manner shown in Figs. I, II and III and indicated by the numeral 17. This clip is protected by the downwardly projecting hook 18, and the purpose of the structure is to hold a large spoon such as the wooden spoon shown in Fig. VIII to one side of the holder as a whole and where the shank of the spoon is too large to normally pass through the gap $g'$. The handle of the spoon is shown supported by the clip 17 as at 17' and resting on the rim of the utensil as at 17''.

Upon the device shown in each of the views will always be found a pair of lugs, 30 and 31, the purpose of which is to prevent the spoon from sliding sideways off the device when the spoon is laid flat, for example, as shown in Fig. VII. It also serves to prevent lateral displacement of the spoon such as by accidentally striking the handle when the spoon is held in the position shown in Fig. IX.

A spring-actuated clamping device is formed by bending two integral lugs such as 19 and 20, and inserting a pivot pin 21, mounted upon the pivot pin 21, as by lugs 19' and 20', is the spring-actuated grip 22. Upon the pivot pin 21 is mounted a coil spring 23, which normally urges the grip 22 to the position shown in Fig. I or into engagement with a utensil as shown in Fig. VI.

Obviously the spring grip may be made as shown in Fig. IV, having a helical spring 24 mounted on a stud 25, or it may have a loop 26 as shown in Fig. V that acts as a spring for the same purpose as the spring 23 if the character of the metal of which the device as a whole is made has sufficient natural temper to permit this construction.

Neither of the alternative arrangements shown in Fig. IV or Fig. V are regarded as being as desirable as that shown in the first three figures and are merely illustrated to show different species of the same device as claimed in the appended claims.

It will be noted that the grip 22 as shown arranged in Fig. I has a very wide range of capabilities to generally engage the rim of a cooking utensil, whatever the shape of the utensil and whether or not it has a bead. It may be attached with a single motion of the user's hand and when so attached cannot be shaken off, and the utensil with its contents with the spoon holder carrying a spoon in either of the positions shown in say, Figs. VI, VIII or IX, may be carried from the cooking range to a table without the holder becoming displaced or without dropping the spoon either outside of the utensil or into its contents.

Thus I have provided a spoon holder of the character described that will firmly engage a utensil with a single motion of the user's hand and to which a spoon may be engaged by an easy motion and that will firmly hold both the utensil and the spoon yet require no manipulation or especial effort on the part of the user to disengage either the spoon or the holder itself from the utensil. It has that handiness which marks every successful kitchen utensil since the users will not employ them if they are not both effective and "handy".

Having thus disclosed my invention in detail in the manner required by statute, what I claim as new and desire to secure by Letters Patent, is—

1. A spoon holder comprising in combination a vertical leg and a horizontal leg at approximately right angles to each other, a spring actuated clamp within the included angle adapted to hold said holder to the rim of a utensil, a lug on the vertical leg adapted to hold a spoon in approximately a vertical position, a lug on the horizontal leg adapted to hold a spoon in approximately a horizontal position on the top of said leg, a clip on the horizontal leg adapted to hold a spoon in approximately a horizontal position on the rim of a utensil and to one side of the said leg, a pair of lugs on the horizontal leg adapted to prevent a spoon from sliding sidewise when resting in approximately a horizontal position on the said leg.

2. A spoon holder comprising in combination a vertical leg and a horizontal leg at approximately right angles to each other, means for holding said spoon holder on the rim of a utensil, a lug on the vertical leg adapted to hold a spoon in approximately a vertical position, a lug on the horizontal leg adapted to hold a spoon in approximately a horizontal position on top of said leg, a clip on the horizontal leg adapted to hold a spoon in approximately a horizontal position on the rim of a utensil and to one side of the said leg, a pair of lugs on the horizontal leg adapted to prevent a spoon from sliding sidewise when resting in approximately a horizontal position on the said leg.

3. A spoon holder comprising in combination a vertical leg and a horizontal leg at approximately right angles to each other, means on the vertical leg adapted to hold a spoon in approximately a vertical position within a utensil, means on the horizontal leg adapted to hold a spoon approximately in a horizontal position on the horizontal leg, means on the horizontal leg adapted to hold a spoon approximately in a horizontal position on top of the rim of a utensil and to one side of the horizontal leg, means on the horizontal leg adapted to prevent a spoon from sliding sidewise when in a horizontal position on said leg, a spring clamp within the angle comprised by the two legs, adapted to attach said holder to a utensil.

4. A spoon holder for a dish, including a flat leg for engaging the inside of the dish, spoon holding means incorporated with said leg adapted to hold a spoon from sliding into the dish, a flat leg made integral with the first named leg and bent at an angle thereto, spoon holding means incorporated with the last named leg adapted to hold a spoon partly over the dish and spring clamping means within the angle of the legs adapted to engage the outside surface of said dish.

5. In a spoon holder comprising an angularly bent flat body member, a pair of clamp lugs integral with one leg of the body, a spring clamp mounted on one of the legs, a dish engaging finger of said clamp that extends toward the other leg of the body and spoon holding means incorporated with each body leg adapted to hold a spoon parallel to the respective leg.

6. A spoon holder comprising a body member of flat metal angularly bent to form two main legs, spoon holding lugs formed integral with each of the main legs for holding a spoon approximately parallel with that leg, a pair of integral clamp lugs formed on one main leg and projecting within the included angle of the main legs, and a spring actuated clamp mounted on the lugs and extending toward the other main leg.

GUSTAVE O. MATTER.